(12) United States Patent
Mishra et al.

(10) Patent No.: US 8,719,426 B1
(45) Date of Patent: May 6, 2014

(54) EFFICIENT PROXIMITY DETECTION

(71) Applicants: Arunesh Mishra, San Francisco, CA (US); Jeffrey Hodes, Calabasas, CA (US)

(72) Inventors: Arunesh Mishra, San Francisco, CA (US); Jeffrey Hodes, Calabasas, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/656,403

(22) Filed: Oct. 19, 2012

Related U.S. Application Data

(60) Provisional application No. 61/615,020, filed on Mar. 23, 2012.

(51) Int. Cl.
*G06F 15/16* (2006.01)

(52) U.S. Cl.
USPC .......................................... 709/227; 709/204

(58) Field of Classification Search
USPC ................................. 709/204, 205, 227, 228
See application file for complete search history.

(56) References Cited

U.S. PATENT DOCUMENTS

| | | | |
|---|---|---|---|
| 6,738,804 B1 | 5/2004 | Lo | |
| 7,231,209 B2 | 6/2007 | Blom et al. | |
| 7,636,575 B2 * | 12/2009 | Enzmann et al. | 455/456.5 |
| 7,859,560 B1 * | 12/2010 | Issa | 348/14.01 |
| 7,898,983 B2 | 3/2011 | Laroia et al. | |
| 8,023,929 B2 * | 9/2011 | Mgrdechian et al. | 455/414.1 |
| 8,051,145 B2 * | 11/2011 | Wu et al. | 709/219 |
| 8,170,481 B2 * | 5/2012 | Rangarajan et al. | 455/41.2 |
| 8,190,119 B2 | 5/2012 | Jabara et al. | |
| 8,205,093 B2 * | 6/2012 | Argott | 713/182 |
| 8,243,897 B2 * | 8/2012 | Groth | 379/201.01 |
| 8,441,367 B1 | 5/2013 | Lee et al. | |
| 2002/0102989 A1 * | 8/2002 | Calvert et al. | 455/456 |
| 2004/0156326 A1 * | 8/2004 | Chithambaram | 370/310 |
| 2004/0198398 A1 * | 10/2004 | Amir et al. | 455/456.6 |
| 2005/0240940 A1 * | 10/2005 | Quinet et al. | 719/315 |
| 2005/0250552 A1 * | 11/2005 | Eagle et al. | 455/567 |
| 2007/0124721 A1 * | 5/2007 | Cowing et al. | 717/100 |
| 2007/0174243 A1 * | 7/2007 | Fritz | 707/3 |
| 2008/0062940 A1 * | 3/2008 | Othmer et al. | 370/338 |
| 2008/0285626 A1 | 11/2008 | Claus et al. | |
| 2009/0264070 A1 * | 10/2009 | Lim | 455/41.2 |
| 2010/0322393 A1 * | 12/2010 | Jin et al. | 379/88.12 |
| 2010/0325194 A1 | 12/2010 | Williamson et al. | |
| 2011/0167125 A1 * | 7/2011 | Achlioptas | 709/206 |

(Continued)

OTHER PUBLICATIONS

Non-Final Office Action from U.S. Appl. No. 13/656,366, dated Apr. 15, 2013, 11 pages.
Responsive Amendment from U.S. Appl. No. 13/656,366, dated Jul. 15, 2013, 10 pages.

(Continued)

*Primary Examiner* — David Lazaro
(74) *Attorney, Agent, or Firm* — Shumaker & Sieffert, P.A.

(57) ABSTRACT

In general, aspects of the present disclosure are directed to techniques for detecting proximity between computing devices. A first computing device may query a server device. Subsequent to querying, the first computing device may receive instructions from the server device to re-query the server device at a first specified time. The first computing device may re-query the server device at the first specified time. Subsequent to re-querying, the first computing device may receive an address associated with a second computing device and instructions from the server device to connect to the second computing device at a second specified time. The first computing device may connect with the second computing device at the second specified time based at least in part on the address associated with the second computing device.

20 Claims, 6 Drawing Sheets

(56) References Cited

U.S. PATENT DOCUMENTS

| | | |
|---|---|---|
| 2011/0238755 A1 | 9/2011 | Khan et al. |
| 2011/0320819 A1* | 12/2011 | Weber et al. ............ 713/176 |
| 2012/0246244 A1* | 9/2012 | Mallet et al. ............ 709/206 |
| 2012/0252498 A1* | 10/2012 | Trinchero et al. ....... 455/456.3 |
| 2013/0038432 A1 | 2/2013 | Grost et al. |

OTHER PUBLICATIONS

Responsive amendment, dated Dec. 2, 2013, for U.S. Appl. No. 13/656,366, 10 pages.

Non-Final Office Action from U.S. Appl. No. 13/656,366, dated Aug. 30, 2013, 12 pages.

\* cited by examiner

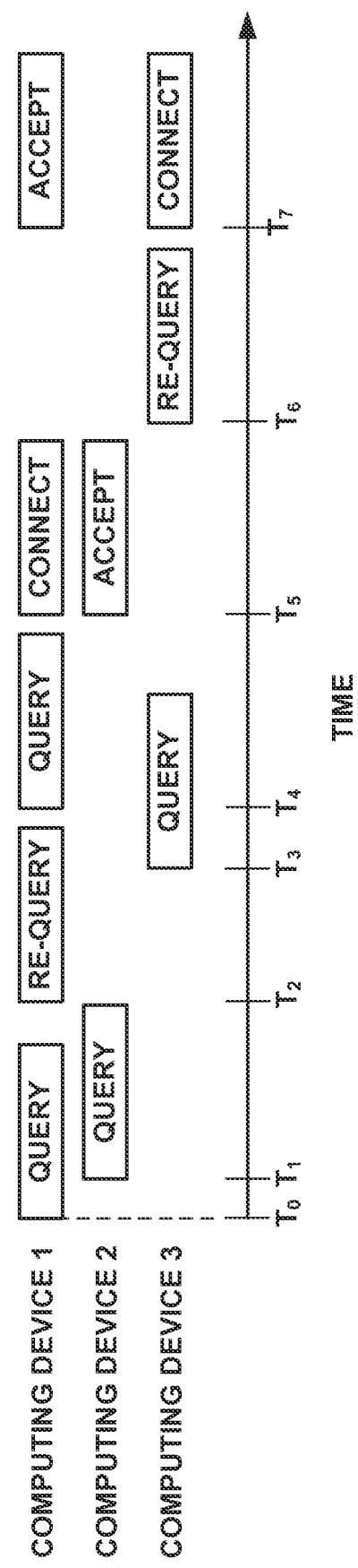

EFFICIENT PROXIMITY DETECTION

RELATED APPLICATIONS

This application claims the benefit of U.S. Provisional Application No. 61/615,020, filed Mar. 23, 2012.

TECHNICAL FIELD

The invention relates to proximity detection for computing devices.

BACKGROUND

With the widespread adoption of social networking, it may be useful for a user of a computing device to be able to find friends that are that are nearby, so that the user may be able to share pictures, videos, music, and other media from the user's computing device to the computing devices of nearby friends. Typical methods of determining if other computing devices are physically proximate of a computing device may include using global positioning system (GPS) coordinates or by setting the Bluetooth on a computing device to discovery mode. Determining if other computing devices are physically proximate of a computing device can also be useful in other applications, such as to detect proximity to inanimate objects, such as paintings, or such objects of value/interest.

SUMMARY

In another aspect, the disclosure is directed to a method for coordinating a connection between a first computing device and a second computing device. The method may include receiving, by a server device, a first query from a first computing device. The method may further include sending, by the server device to the first computing device, instructions to re-query at a first specified time. The method may further include receiving, by the server device, a second query from a second computing device. The method may further include sending, by the server device to the second computing device, instructions to accept a connection at a second specified time that occurs after the first specified time. The method may further include receiving, by the server device, a third query from the first computing device at the first specified time. The method may further include sending, by the server device to the first computing device, an address associated with the second computing device and instructions to connect to the second computing device at the second specified time based at least in part on the address.

In another aspect, the disclosure is directed to a server device. The server device may include one or more processors. The server device may further include a network interface configured to communicate with a first computing device and a second computing device. The server device may further include a device connection module operable on the one or more processors and configured to: receive, via the network interface, a first query from the first computing device, send to the first computing device, via the network interface, instructions to re-query at a first specified time, receive, via the network interface, a second query from the second computing device, send to the second computing device, via the network interface, instructions to accept a connection at a second specified time that occurs after the first specified time, receive, via the network interface, a third query from the first computing device at the first specified time, and send to the first computing device, via the network interface, an address associated with the second computing device and instructions to connect to the second computing device at the second specified time based at least in part on the address.

In another aspect, the disclosure is directed to a computer-readable medium comprising instructions. The instructions, when executed on at least one programmable processor, may cause the at least one programmable processor to perform operations including receiving, by a server device, a first query from a first computing device. The instructions, when executed on at least one programmable processor, may further cause the at least one programmable processor to perform operations including sending, by the server device to the first computing device, instructions to re-query at a first specified time. The instructions, when executed on at least one programmable processor, may further cause the at least one programmable processor to perform operations including receiving, by the server device, a second query from a second computing device. The instructions, when executed on at least one programmable processor, may further cause the at least one programmable processor to perform operations including sending, by the server device to the second computing device, instructions to accept a connection at a second specified time that occurs after the first specified time. The instructions, when executed on at least one programmable processor, may further cause the at least one programmable processor to perform operations including receiving, by the server device, a third query from the first computing device at the first specified time. The instructions, when executed on at least one programmable processor, may further cause the at least one programmable processor to perform operations including sending, by the server device to the first computing device, an address associated with the second computing device and instructions to connect to the second computing device at the second specified time based at least in part on the address.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6 is a timing diagram illustrating example timings of example computing devices querying a server device and connecting with each other according to some aspects of the present disclosure.

DETAILED DESCRIPTION

Figure 1:
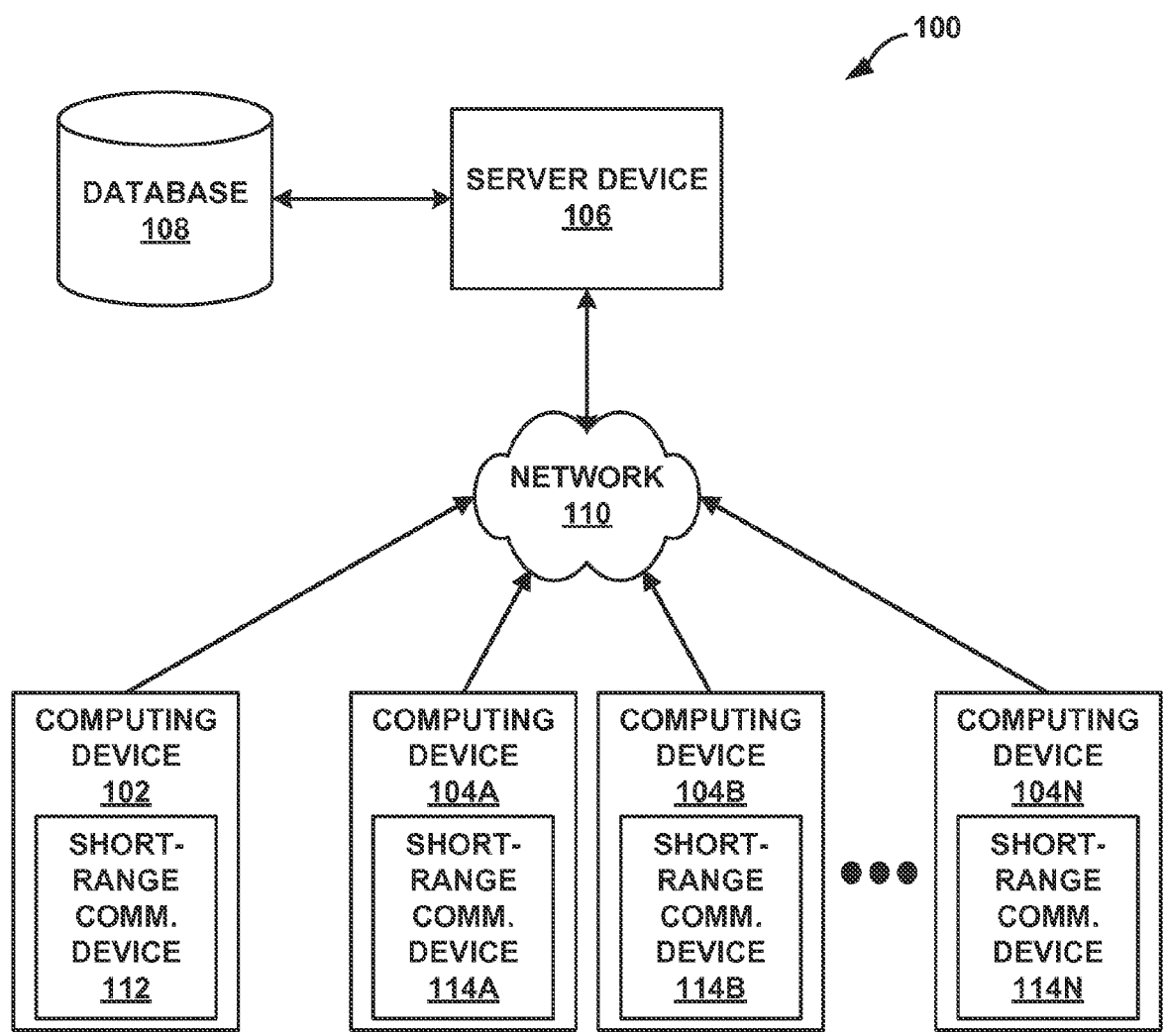
FIG. 1 is a block diagram illustrating an example communication system according to some aspects of the present disclosure.

In general, aspects of the present disclosure are directed to techniques for detecting proximity between computing devices. A third-party server device may be used to aid computing devices in detecting other proximate computing devices.

Typically, proximity detection services require computing devices using the service to repeatedly transmit their location information, such as Global Positioning System (GPS) coordinates determined by GPS receivers built into the computing devices, to the service at short intervals, so that the service may have up-to-date location information for each computing device using the service. However, requiring every computing device associated with the service to periodically transmit its location information at short intervals can be very energy inefficient, and may unnecessarily drain the batteries of computing devices using the proximity detection service. Furthermore, location information, such as GPS coordinates determined by GPS receivers, may be of limited accuracy. For example, consumer GPS receivers may, on average, be accurate to within 10 to 20-meters, which may not be accurate enough for detecting social proximity. In addition, location information are typically limited to providing two-dimensional location information, and thus may not be able to, for example, differentiate between users on different floors of a building.

If a particular server device is already being frequently queried by computing devices, the computing devices can opt-in to using the server device to aid the computing devices in detecting other computing devices that are within physical proximity by directing computing devices to connect via short-range communication with other computing devices within the computing devices' vicinity. A first computing device that is opted-in to the proximity service provided by the server device may query the server device. Responsive to the querying by the first computing device, the server device may instruct the first computing device to re-query the server device at a first specified time in the future. The first specified time may typically be one or more minutes in the future. After the querying by the first computing device and before the first specified time occurs, a second computing device that is also opted-in to the proximity service provided by the server device may query the server device. Responsive to the querying by the second computing device, the server device may instruct the second computing device to accept a connection at a second specified time in the future that is after the first specified time. The second specified time may usually also be minutes in the future. At the first specified time, the first computing device may re-query the server device, and the server device may send to the first computing device an address associated with the second computing device. The address may be an address of a short-range communication device in the second computing device, such as an address of a Bluetooth device in the second computing device. The server device may also instruct the first computing device to connect with the second computing device at the second specified time. At the second specified time, the first computing device may attempt to connect with the second computing device via a short-range communication device using the address sent by the server device, and the second computing device may accept the connection with the first computing device via its short-range communication device.

In this way, the first computing device may be able to detect that the second computing device is within its proximity, and the second computing device may also be able to detect that the first computing device is within its proximity. If the first computing device and the second computing device are unable to establish a connection with each other, then the inference may be that the first computing device and the second computing device are outside of the communication range of each other's respective short-range communication device, and that the first computing device and the second computing device are not within proximity of each other. Further, by instructing the first and second computing devices to connect via short-range communication at a specified time, the first and second computing devices may be able to turn off the short-range communication devices unless instructed by the server device to switch the communication devices on at a specified time, thereby reducing battery drain on the computing devices.

FIG. 1 is a block diagram illustrating an example communication system 100 according to some aspects of the present disclosure. As shown in FIG. 1, server device 106 may communicate with computing devices 102 and 104A-104N via network 110 to coordinate communications between computing device 102 and one or more of computing devices 104A-104N ("computing devices 104"), so that computing devices 102 and one or more of computing devices 104 may attempt to detect whether they are physically proximate of each other.

In some examples, server device 106 may coordinate communications only between devices that have explicitly or implicitly opted in to the physical proximity service provided by server device 106. If server device 106 stores location or proximity data of computing devices, those data may be encrypted and/or anonymized. If an opted-in computing device subsequently opts out of the physical proximity service provided by server device 106, server device 106 may delete any location or proximity data that is stored on server device 106. While a computing device is opted-in to the physical proximity service, periodic reminders or indications may appear on the computing device reminding the user of the computing device that the device is still opted-in to the physical proximity service.

Computing devices 102 and 104 may be mobile computing devices, including but not limited to a mobile phone, a tablet computer, a personal digital assistant, a handheld computer, a media player, and the like, including a combination of two or more of these items. Computing devices 102 and 104 may include respective short-range communication devices 112 and 114A-114N ("short-range communication devices 114"). Short-range communication devices 112 and 114 may be devices capable of short-range direct communications with other short-range communication devices via a short-range protocol. In some examples, short-range communication devices 112 and 114 may be Bluetooth devices, radio frequency identification (RFID) devices, near-field communication (NFC) devices, and the like.

Server device 106 may include one or more computing devices, including but not limited to a server computing device and the like, or may include a cloud computing service. A cloud computing service may include one or more remote servers that may provide one or more services, including but not limited to computation, software, data access, and storage services, without requiring end-user knowledge of the physical location and configuration of the systems that deliver the one or more services. Network 106 may be any communications network, such as the Internet, a local area network, a wide area network, and the like.

Computing devices 102 and 104 may regularly communicate with server device 106 for purposes unrelated to detecting other proximate computing devices. For example, server device 106 may be a weather information server operable to receive regular queries for weather information from computing devices 102 and 104.

Computing device 102 may query server device 106 during the course of its regular communications with server device 106. During the course of querying server device 106, computing device 102 may send an indication that computing device 102 is interested in discovering other computing devices in physical proximity to computing device 102. Computing device 102 may also send information associated with short-range communication device 104 to server device 106. For example, if short-range communication device 104 is a Bluetooth device, then computing device 102 may send a Bluetooth address associated with short-range communication device 104 to server device 106. During the course of querying server device 106, computing device 102 may also send location information associated with computing device 102. For example, computing device 102 may send global positioning system (GPS) coordinates or any other indication of the location of computing device 102 to server device 106.

Server device 106 may receive the query from computing device 102 and may store the information sent by computing device 102, such as the Bluetooth address and the location information associated with computing device 102, into database 108. Responsive to receiving the query from computing device 102, server device 106 may send instructions to computing device 102 to re-query server device 106 at a first specified time. In some examples, server device 106 may send instructions to computing device 102 to re-query server device after a specified delay, such as after ten seconds, after thirty seconds, after a minute, after two minutes, after five minutes, etc.

Subsequent to querying server device 106, computing device 102 may receive from server device 106 instructions to re-query server device 106 at the first specified time. In some examples, computing device 106 may receive from server device 106 instructions to re-query server device 106 after the specified delay.

Before the first specified time and the specified delay, one of the computing device 104, such as computing device 104A, may query server device 106. Similar to computing device 102, during the course of querying server device 106, computing device 104A may also send information associated with short-range communication device 114A to server device 106. For example, if short-range communication device 114A is a Bluetooth device, then computing device 104A may send a Bluetooth address associated with short-range communication device 114A or any other identifier of short-range communication device 114A to server device 106. During the course of querying server device 106, computing device 104A may also send location information associated with computing device 104A. For example, computing device 104A may send GPS coordinates or any other indication of the location of computing device 104A to server device 106.

Server device 106 may receive the query from computing device 104A and may store the information sent by computing device 104A, such as the Bluetooth address and the location information associated with computing device 104A, into database 108. Responsive to receiving the query from computing device 104A, server device 106 may send instructions to computing device 104A to accept a connection at a second specified time that occurs after the first specified time and after the specified delay. Computing device 104A, after receiving the instructions to accept a connection at the second specified time, may turn off short-range communication device 114A until the second specified time, thereby saving energy and prolonging the battery life of computing device 104A.

In some examples, server device 106 may not direct computing device 104A to accept a connection at the second specified time if server device 106 determines that computing devices 102 and 104A are physically located too far away from each other (e.g., more than a specified distance from each other). The determination made by server device 106 may be based at least in part on the location information associated with computing device 102 and the location information associated with computing device 104A received by server device 106.

At the first specified time, or after the specified delay, computing device 102 may re-query server device 106. Server device 106 may receive the query from computing device 102 and, responsive to receiving the query, may send to computing device 102 an address associated with computing device 104A as well as instructions to connect to computing device 104A at the second specified time based at least in part on the address associated with computing device 104A. In some examples, the address associated with computing device 104A may be the Bluetooth address associated with short-range communication device 114A previously sent by computing device 104A to server device 106.

In some examples, server device 106 may not direct computing device 102 to attempt to connect to computing device 104A if server device 106 determines that computing devices 102 and 104A are physically located too far away from each other (e.g., more than a specified distance from each other). The determination made by server device 106 may be based at least in part on the location information associated with computing device 102 and the location information associated with computing device 104A received by server device 106 from respective computing devices 102 and 104A.

Subsequent to re-querying, computing device 102 may receive from server device 106 an address associated with computing device 104A and instructions from server device 106 to connect to computing device 104A at a second specified time. At the second specified time, computing device 102 may attempt to connect with computing device 104A based at least in part on the address associated with computing device 104A, and computing device 104A may be ready to accept a connection from computing device 102 or any other computing devices. In some examples, connecting computing device 102 with computing device 104A may include short-range communication device 112 directly connecting with short-range communication device 114A based on the address received by computing device 102 from server device 106. In some examples, computing device 102 may leave short-range communication device 112 turned off until the second specified time. At the second specified time, computing device 102 may turn on short-range communication device 112, attempt to connect to computing device 104A, and may subsequently turn off short-range communication device 112.

If computing device 102 is able to successfully connect with computing device 104A, then computing device 102 and computing device 104A are physically within the communication range of short-range communication devices 112 and 114A, and thus may be determined to be physically proximate of each other. However, if computing device 102 is unable to successfully communicate with computing device 104A, then computing devices 102 and 104A may be determined to not be physically proximate of each other. In this way, computing devices 102 and 104A may be able to determine whether they are physically proximate of each other. After computing device 102 has successful connected to computing device 104A via short-range communication devices 112 and 114A, data may be transferred via the short-range communication devices 112 and 114A, or, alternatively, via a third party computing device, such as a remote server system (not shown).

If computing device 102 successfully connects with computing device 104A, a metric for the proximity strength of the devices 102 and 104A can be computed based on physical layer parameters of the respective short-range communication devices 112 and 114A, such as signal strength or infrared signal properties of the short-range communication devices 112 and 114A. The computed proximity strength can be used to provide a weight value to a proximity-pair of devices 102 and 104A, and the weight value can be used to determining proximity groups of devices.

In the example illustrated in FIG. 1, computing device 102 may be considered the leader of the transaction between computing device 102 and computing device 104A because computing device 102 queries server device 106 before computing device 104A and because computing device 102 is instructed by server device 106 to connect to computing device 104A. Conversely, computing device 104A may be considered the follower because computing device 104A queries server device 106 after computing device 102, and because computing device 104A is instructed by server device 106 to accept a connection from other computing devices.

Similarly, besides the transaction between computing device 102 and computing device 104A, computing device 102 may perform similar transactions with server device 106 to attempt to connect to any other one or more of the computing device 104, such as connecting to computing device 114B, and may act as the follower or the leader in its transactions. Computing device 104A may also perform similar transactions with server device 106 to attempt to connect to any other one or more of the computing devices 104, such as connecting to computing device 114B, and may act as the follower or the leader in its transactions. Server device 106 may store the status of all connections in database 108, and may manage the transactions between computing devices 102 and 104 to minimize or otherwise eliminate conflicts between the transactions. In this way, each of computing devices 102 and 104 may be able to determine which of the other computing devices 102 and 104 are within its physical proximity.

Figure 2:
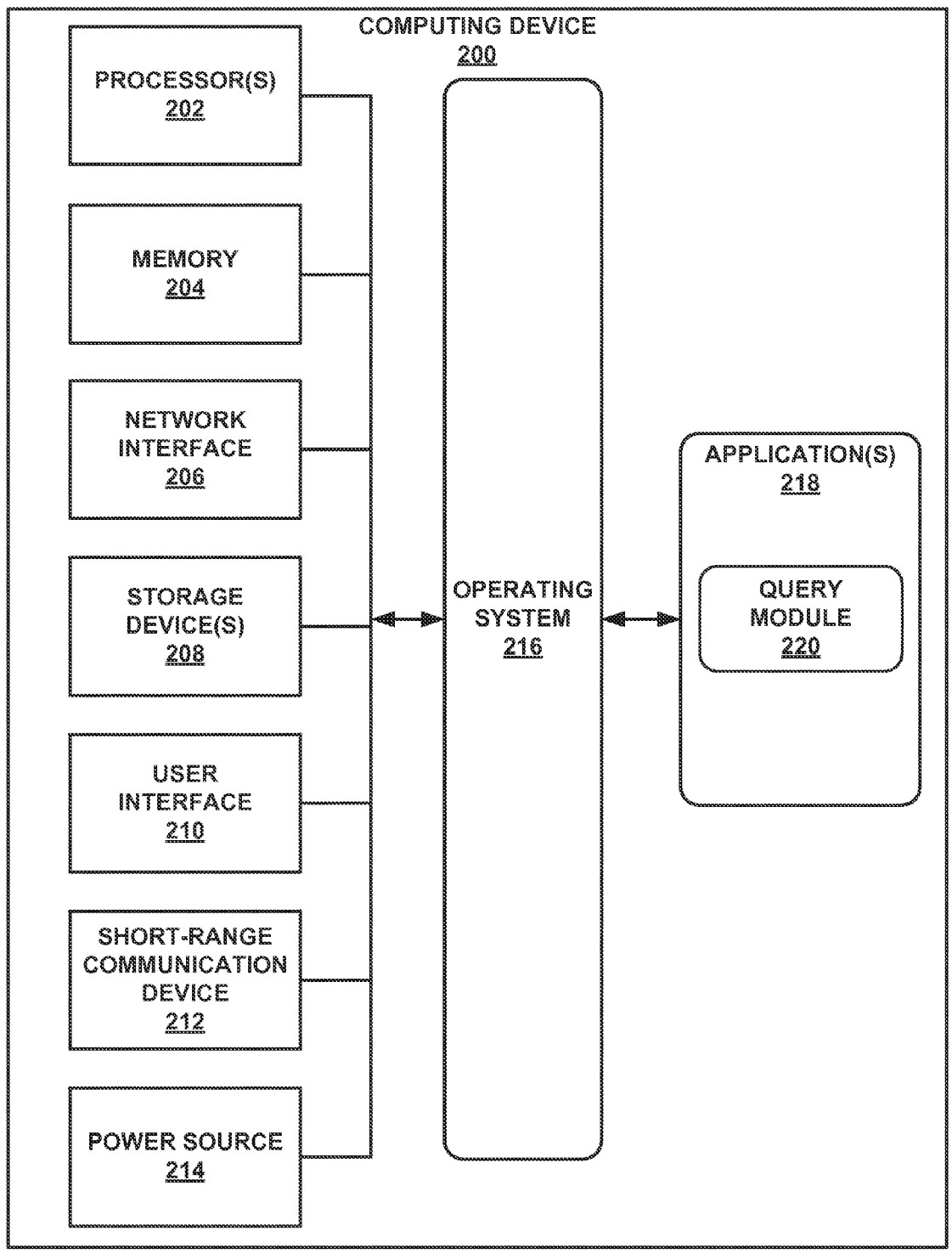
FIG. 2 is a block diagram illustrating further details of an example computing device according to some aspects of the present disclosure.

FIG. 2 is a block diagram illustrating further details of one example of computing device 200, such as computing device 100 shown in FIG. 1, according to some aspects of the present disclosure. FIG. 2 illustrates only one particular example of computing device 200. Many other example embodiments of computing device 200 may be used in other instances.

As shown in the specific example of FIG. 2, computing device 200 may include one or more processors 202, memory 204, a network interface 206, one or more storage devices 208, user interface 210, short-range communication device 212, and battery 214. Computing device 200 may also include an operating system 216. Computing device 200, in one example, may further include one or more applications 218, such as query module 220. One or more applications 218 may also be executable by computing device 200. Components of computing device 200 may be interconnected (physically, communicatively, and/or operatively) for inter-component communications.

One or more processors 202, in one example, may implement functionality and/or process instructions for execution within computing device 200. For example, one or more processors 202 may be capable of processing instructions stored in memory 204 and/or instructions stored on one or more storage devices 208.

Memory 204, in one example, may store information within computing device 200 during operation. Memory 204, in some examples, may represent a computer-readable storage medium. In some examples, memory 204 may be a temporary memory, meaning that a primary purpose of memory 204 may not be long-term storage. Memory 204, in some examples, may be described as a volatile memory, meaning that memory 204 may not maintain stored contents when computing device 200 is turned off. Examples of volatile memories may include random access memories (RAM), dynamic random access memories (DRAM), static random access memories (SRAM), and other forms of volatile memories known in the art. In some examples, memory 204 may be used to store program instructions for execution by one or more processors 202. Memory 204, in one example, may be used by software or applications running on computing device 200 (e.g., one or more applications 218) to temporarily store data and/or instructions during program execution.

One or more storage devices 208, in some examples, may also include one or more computer-readable storage media. One or more storage devices 208 may be configured to store larger amounts of information than memory 204. One or more storage devices 208 may further be configured for long-term storage of information. In some examples, one or more storage devices 208 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 200, in some examples, may also include a network interface 206. Computing device 200, in such examples, may use network interface 206 to communicate with external devices via one or more networks, such as one or more wired or wireless networks. Network interface 206 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 200 may use network interface 206 to wirelessly communicate with an external device (e.g. server device 106 of FIG. 1) such as a server, mobile phone, or other networked computing device.

Computing device 200 may also include user interface 210. User interface 210 may include one or more input devices. Input device, in some examples, may be configured to receive input from a user through tactile, electromagnetic, audio, and/or video feedback. Examples of input device may include a touch-sensitive display, mouse, keyboard, voice responsive system, video camera, microphone or any other type of device for detecting gestures by a user. In some examples, a touch-sensitive display may include a presence-sensitive screen.

User interface 210 may also include one or more output devices. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output device may include a speaker, a cathode ray tube (CRT) monitor, a liquid crystal display (LCD), or any other type of device that can generate intelligible output to a user.

Computing device 200, in some examples, may include power source 214, which may be rechargeable and provide power to computing device 200. Power source 214, in some examples, may be a battery made from nickel-cadmium, lithium-ion, or other suitable material.

Examples of computing device 200 may include operating system 216. Operating system 216 may control the operation of components of computing device 200. For example, operating system 216 may facilitate the interaction of one or more applications 218 with hardware components of computing device 200.

As shown in FIG. 2, one or more applications 218 may include query module 220. Query module 220 may include program instructions and/or data that are executable by one or more processors 202 of computing device 200. For example, query module 220 may include instructions that cause one or more applications 218 executing on computing device 200 to perform one or more of the operations and actions described in FIGS. 1-2 and 4-6.

In some examples, the query module may be configured to query, via network interface 206, a server device, such as server device 106 of FIG. 1. The query module may be further configured to, subsequent to querying, receive instructions via network interface 206 from a server device to re-query the server device at a first specified time. The query module may be further configured to re-query the server device via network interface 206 at the first specified time. The query module may be further configured to, subsequent to re-querying, receive via network interface 206 an address associated with a second computing device at a second specified time.

Any applications, e.g., one or more applications 218, implemented within or executed by computing device 200 may be implemented or contained within, operable by, executed by, and/or be operatively/communicatively coupled to components of computing device 200, e.g., one or more processors 202, memory 204, network interface 206, one or more storage devices 208, user interface 210, and short-range communication device 212.

In some examples, computing device 200 may include short-range communication device 212, such as the short-range communication devices 112 and 114A-114N shown in FIG. 1. Short-range communication device 212, in some examples, may be configured to connect or attempt to connect with a second computing device at a second specified time based at least in part on an address associated with the second computing device.

As described herein, short-range communication device 212 may be active hardware that is configured to communicate with other short-range communication devices. In general, short-range communication device 212 may be configured to communicate wirelessly with other devices in physical proximity to short-range communication device 212 (e.g., less than approximately five meters, less than approximately ten meters, or less than approximately one hundred meters). In some examples, short-range communication device 212 may be a Bluetooth device operable to communicate with other Bluetooth devices via a Bluetooth protocol. In other examples, short-range communication device 212 may be replaced with an alternative short-range communication device configured to communicate with and receive data from other short-range communication devices. These alternative short-range communication devices may operate according to radio frequency identification (RFID), near-field communication (NFC), Ultra-Wideband radio, infrared, or other similar protocols. In some examples, short-range communication device 212 may be an external hardware module that is coupled with computing device 200 via a bus (such as via a Universal Serial Bus (USB) port). Short-range communication device 212, in some examples, may also include software that may, in some examples, be independent from operating system 216, and which may, in some other examples, be a sub-routine of the operating system 216.

Figure 3:
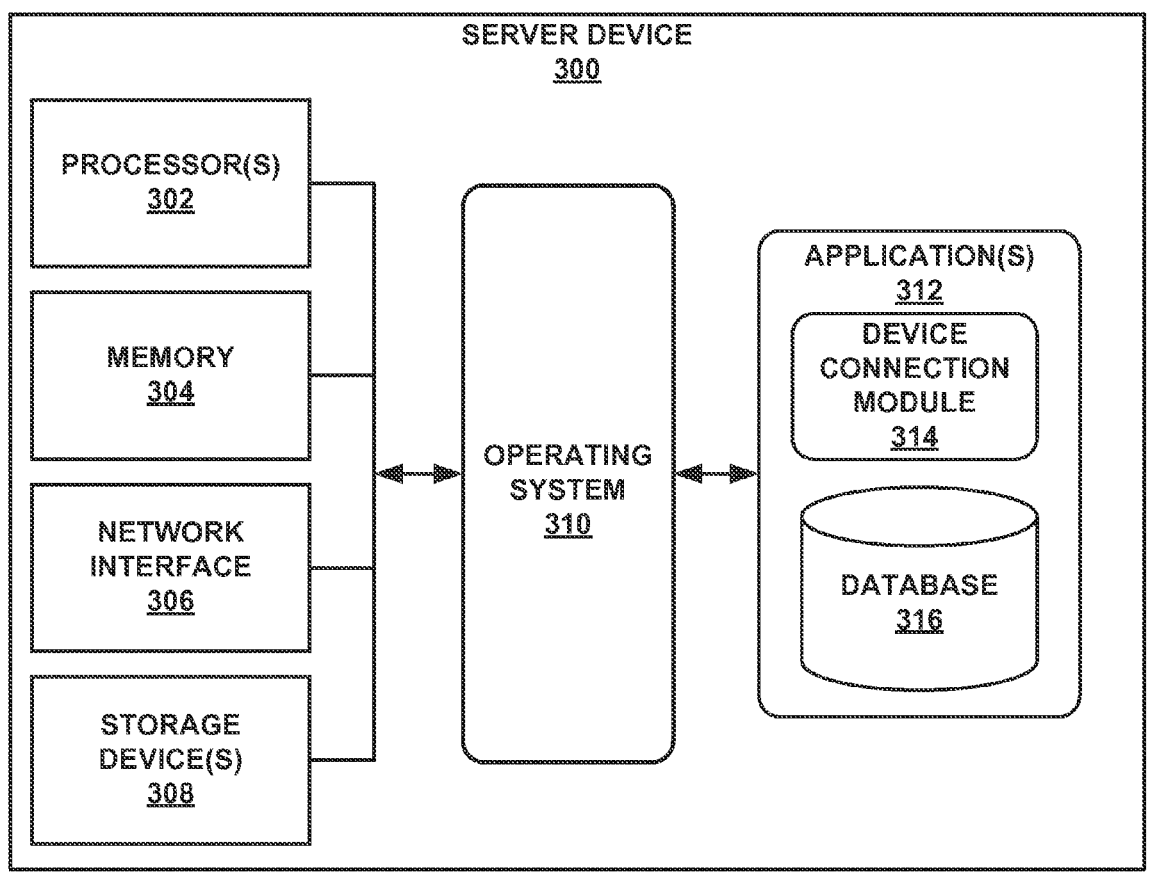
FIG. 3 is a block diagram illustrating further details of an example server device according to some aspects of the present disclosure.

FIG. 3 is a block diagram illustrating further details of one example of a server device, such as server device 106 shown in FIG. 1, according to some aspects of the present disclosure. FIG. 3 illustrates only one particular example of a server device, and many other examples of the server device may be used in other instances.

As shown in the specific example of FIG. 3, server device 300 may include one or more processors 302, memory 304, network interface 306, and one or more storage devices 308. Server device 300 may also include operating system 310 that is executable by server device 300. Server device 300, in one example, may further include one or more applications 312, including device detection module 314 and database 316. Each of the components 302, 304, 306, 308, 310, 312, 314, and 316 may be interconnected (physically, communicatively, and/or operatively) for inter-component communications.

One or more processors 302, in one example, may be configured to implement functionality and/or process instructions for execution within server device 300. For example, one or more processors 302 may be capable of processing instructions stored in memory 304 or instructions stored on one or more storage devices 308.

Memory 304, in one example, may be configured to store information within server device 300 during operation. Memory 304, in some examples, may be described as a computer-readable storage medium. In some examples, memory 304 may be a temporary memory, meaning that a primary purpose of memory 304 may not be long-term storage. Memory 304, in some examples, may be described as a volatile memory, meaning that memory 304 may not maintain stored contents when the computer is turned off. Examples of volatile memories may include random access memories (RAM), dynamic random access memories (DRAM), static random access memories (SRAM), and other forms of volatile memories known in the art. In some examples, memory 304 may be used to store program instructions for execution by one or more processors 302. Memory 304, in one example, may be used by software or applications running on server device 300 (e.g., one or more applications 312) to temporarily store information during program execution.

One or more storage devices 308, in some examples, may also include one or more computer-readable storage media. One or more storage devices 308 may be configured to store larger amounts of information than memory 304. One or more storage devices 308 may further be configured for long-term storage of information. In some examples, one or more storage devices 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Server device 300, in some examples, may also include network interface 306. Server device 300, in one example, uses network interface 306 to communicate with external devices, such as computing device 102 and computing device 102 shown in FIG. 1, via one or more networks, such as one or more wireless networks, or network 110 shown in FIG. 1. Network interface 306 may be a network interface card, such as an Ethernet card, an optical transceiver, a radio frequency transceiver, or any other type of device that can send and receive information. Other examples of such network interfaces may include Bluetooth®, 3G and Wi-Fi® radios in mobile computing devices as well as USB. In some examples, server device 300 may use network interface 306 to wirelessly communicate with an external device, such as a first computing device and a second computing device, a mobile phone, or other networked computing device.

Server device 200 may include operating system 310. Operating system 310, in some examples, may control the operation of components of server device 300. For example, operating system 310 may facilitate the interaction of one or more applications 312, including device connection module 314 and location database 316, with one or more processors 302, memory 304, network interface 306, and one or more storage devices 308. One or more applications 312 may include program instructions and/or data that are executable on one or more processors 302.

One or more applications 312 may include device connection module 314. Device connection module 314 may be an application operable by one or more processors 302 and may be configured to coordinate connections between computing devices. Device connection module 314 may be configured to receive, via network interface 306, a first query from a first computing device. Device connection module 314 may be further configured to send, via network interface 306, instructions to re-query at a first specified time to the first computing device. Device connection module 314 may be further configured to receive, via network interface 306, a second query from a second computing device. Device connection module 314 may be further configured to send, via network interface 306, instructions to accept a connection at a second specified time that occurs after the first specified time to the second computing device. Device connection module 314 may be further configured to receive, via network interface 306, a third query from the first computing device at the first specified time. Device connection module 314 may be further configured to send, via network interface 306, an address associated with the second computing device and instructions to connect to the second computing device at the second specified time based at least in part on the address to the first computing device.

Device connection module 314 may be further configured to receive, via network interface 306, a fourth query from the first computing device. Device connection module 314 may be further configured to send, via network interface 306, instructions to re-query at a third specified time to the first computing device. Device connection module 314 may be further configured to receive, via network interface 306, a fifth query from a third computing device. Device connection module 314 may be further configured to send, via network interface 306, instructions to accept a connection at a fourth specified time that occurs after the third specified time to the third computing device. Device connection module 314 may be further configured to receive, via network interface 306, a sixth query from the first computing device at the third specified time. Device connection module 314 may be further configured to send, via network interface 306, an address associated with the third computing device and instructions to connect to the third computing device at the fourth specified time based at least in part on the address to the first computing device.

One or more applications 312 may also include database 316. Database 316 may be an application operable by one or more processors 302 and configured to store location information received by server device 300 from external devices, such as computing device 102 and computing device 112 shown in FIG. 1.

Figure 4:
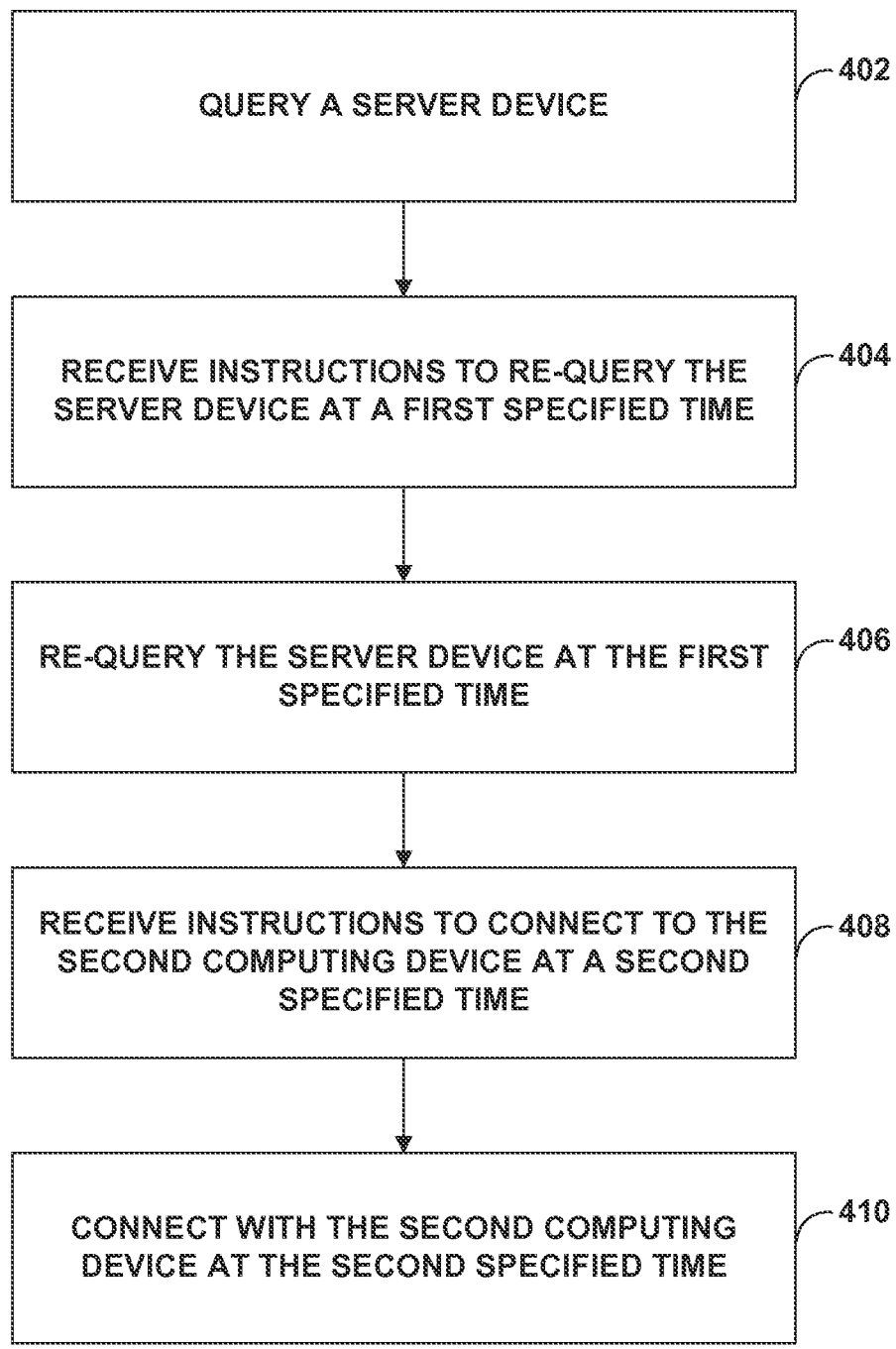
FIG. 4 is a flow chart illustrating an example process for connecting a first computing device to a second computing device according to some aspects of the present disclosure.

FIG. 4 is a flow chart illustrating an example process for connecting a first computing device to a second computing device according to some aspects of the present disclosure. The process may include querying, by a first computing device, a server device (402). The process may further include, subsequent to querying, receiving, by the first computing device, instructions from the server device to re-query the server device at a first specified time (404). The process may further include re-querying, by the first computing device, the server device at the first specified time (406). The process may further include, subsequent to re-querying, receiving, by the first computing device, an address associated with a second computing device and instructions from the server device to connect to the second computing device at a second specified time (408). The process may further include connecting, by the first computing device, with the second computing device at the second specified time based at least in part on the address associated with the second computing device (410).

In some examples, receiving instructions from the server device to re-query the server device at a first specified time may include receiving, by the first computing device, instructions from the server device to re-query the server device after a specified delay, and re-querying the server device at the first specified time may include re-querying, by the first computing device, the server device after the specified delay. In some examples, the specified delay is at least one minute.

In some examples, connecting, by the first computing device, with the second computing device may include directly connecting, by the first computing device, with the second computing device. Furthermore, in some examples, directly connecting, by the first computing device, with the second computing device may include directly connecting, by a first short-range communication device in the first computing device, with a second short-range communication device in the second computing device. In some examples, the first short-range communication device may be a first Bluetooth device, and the second short-range communication device may be a second Bluetooth device. In some examples, querying the server device may include sending, by the first computing device, a Bluetooth address of the first Bluetooth device to the server device. In some examples, the address associated with the second computing device may be a Bluetooth address of the second Bluetooth device.

Figure 5:
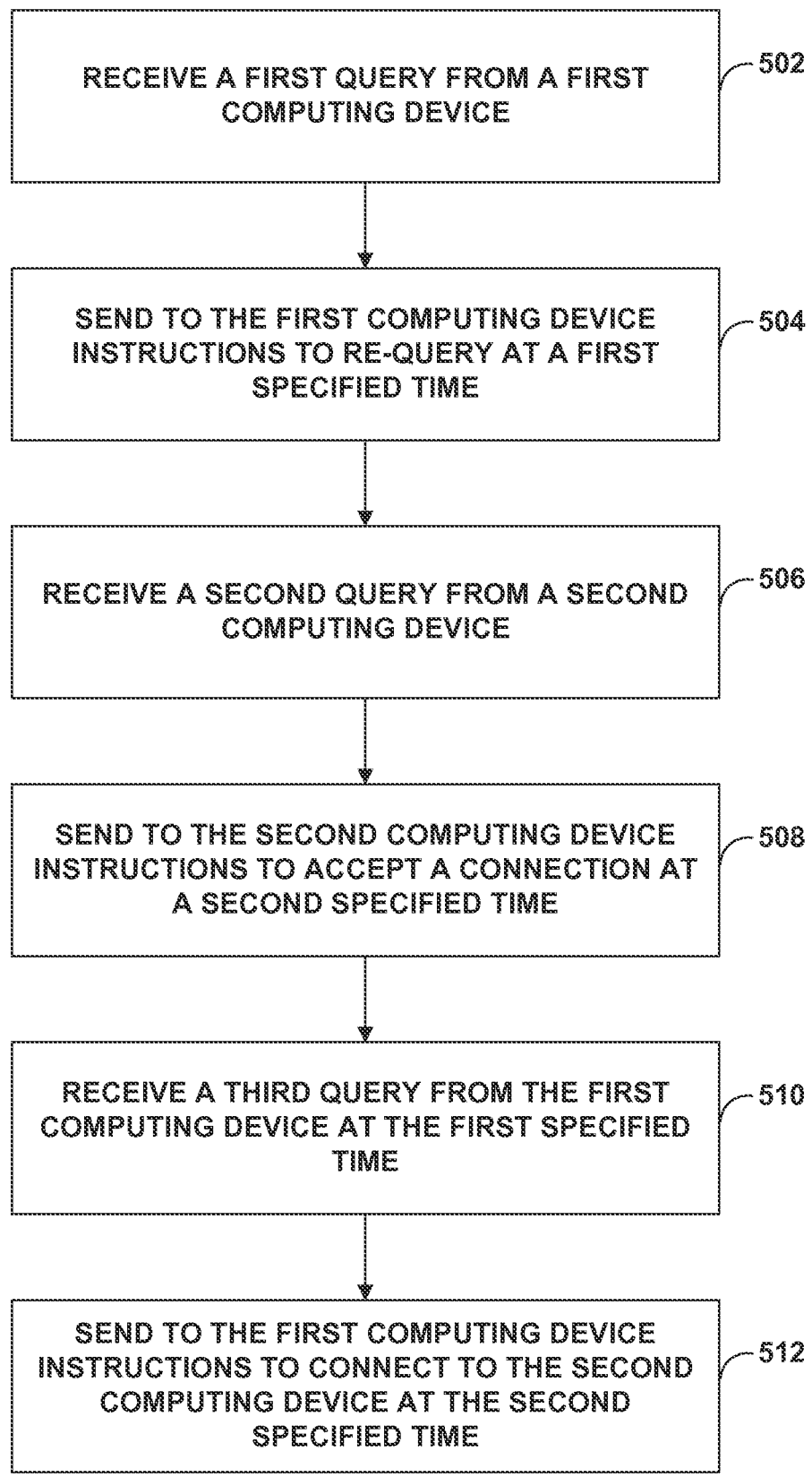
FIG. 5 is a flowchart illustrating an example process for coordinating a connection between a first computing device and a second computing device according to some aspects of the present disclosure.

FIG. 5 is a flowchart illustrating an example process for coordinating a connection between a first computing device and a second computing device according to some aspects of the present disclosure. The process may include receiving, by a server device, a first query from a first computing device (502). The process may further include sending, by the server device to the first computing device, instructions to re-query at a first specified time (504). The process may further include receiving, by the server device, a second query from a second computing device (506). The process may further include sending, by the server device to the second computing device, instructions to accept a connection at a second specified time that occurs after the first specified time (508). The process may further include receiving, by the server device, a third query from the first computing device at the first specified time (510). The process may further include sending, by the server device to the first computing device, an address associated with the second computing device and instructions to connect to the second computing device at the second specified time based at least in part on the address (512).

In some examples, the process may further include receiving, by a server device, a fourth query from a first computing device. In some examples, the process may further include sending, by the server device to the first computing device, instructions to re-query at a third specified time. In some examples, the process may further include receiving, by the server device, a fifth query from a third computing device. In some examples, the process may further include sending, by the server device to the third computing device, instructions to accept a connection at a fourth specified time that occurs after the third specified time. In some examples, the process may further include receiving, by the server device, a sixth query from the first computing device at the third specified time. In some examples, the process may further include sending, by the server device to the first computing device, an address associated with the third computing device and instructions to connect to the third computing device at the fourth specified time based at least in part on the address.

In some examples, the process may further include storing, by the server device, the address associated with the second computing device in a database. In some examples, the process may further include storing, in a database by the server device, current state of connections of the first computing device and the second computing device. In some examples, the process may further include filtering a plurality of computing devices based on a location of the plurality of computing devices. In some examples, the address associated with the second computing device may be a Bluetooth address associated with a Bluetooth device in the second computing device.

In some examples, sending instructions to re-query at a first specified time may include sending, by the server device to the first computing device, instructions to re-query after a specified delay, and receiving a third query from the first computing device at the first specified time may include receiving, by the server device, the third query from the first computing device after the specified delay. In some examples, the specified delay may be at least one minute.

FIG. 6 is a timing diagram illustrating example timings of example computing devices querying a server device and connecting with each other according to some aspects of the present disclosure. As shown in FIG. 6, computing device 1, computing device 2, and computing device 3 may query a server device and attempt to connect with each other.

At time $T_0$, computing device 1 may query a server device, and computing device 1 may receive instructions from the server device to re-query the server device at time $T_2$. At time $T_1$, computing device 2 may query the server device and may receive instructions from the server device to accept connections at time $T_5$. At time $T_2$, computing device 1 may re-query the server device and may receive instructions to connect to computing device 2 at time $T_5$. At time $T_5$, computing device 1 may attempt to connect to computing device 2, and computing device 2 may accept connections.

At time $T_3$, computing device 3 may query the server device, and may receive instructions from the server device to re-query the server device at time $T_6$. At time $T_4$, computing device 1 may query the server device and may receive instructions from the server device to accept connections at time $T_7$. At time $T_6$, computing device 3 may re-query the server device and may receive instructions from the server device to connect to computing device 1 at time $T_7$. At time $T_7$, computing device 3 may attempt to connect to computing device 1, and computing device 1 may accept connections. The server device may ensure that there are no conflicts, so that a computing device is not attempting to connect to multiple other computing devices at the same time. As shown in FIG. 6, server device schedules computing device 1 to attempt to connect to computing device 2 at time $T_5$, and schedules computing device 1 to receive connections at time $T_7$.

As can be seen in FIG. 6, although computing device 1 may be considered the leader in its transaction with computing device 2, computing device 1 may also be considered the follower in its transaction with computing device 3 because its query of the server device at time $T_4$ occurs after computing device 3's query of the server device at time $T_3$. Furthermore, although computing device 1 is still in the process of transacting with computing device 2, because computing device 1 is still waiting to attempt to connect to computing device 2 at later time $T_5$, computing device 1 is able to start transacting with computing device 3.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

As used throughout this disclosure, headings are included to improve the clarity of the disclosure and are not used to define separate examples. In some examples, features of various examples may be combined and/or used from among multiple headings.

Various embodiments of the disclosure have been described. These and other embodiments are within the scope of the following claims.

The invention claimed is:

1. A method comprising:
receiving, by a server device, a first query from a first computing device;
responsive to receiving the first query, sending, by the server device to the first computing device, instructions to re-query at a first specified time;
receiving, by the server device, a second query from a second computing device;
responsive to receiving the second query, sending, by the server device to the second computing device, instructions to accept a connection at a second specified time that occurs after the first specified time;
receiving, by the server device, a third query from the first computing device at the first specified time; and
responsive to receiving the third query, sending, by the server device to the first computing device, an address associated with the second computing device and instructions to connect to the second computing device at the second specified time based at least in part on the address.

2. The method of claim 1, further comprising:
receiving, by a server device, a fourth query from a first computing device;
sending, by the server device to the first computing device, instructions to re-query at a third specified time;
receiving, by the server device, a fifth query from a third computing device;
sending, by the server device to the third computing device, instructions to accept a connection at a fourth specified time that occurs after the third specified time;
receiving, by the server device, a sixth query from the first computing device at the third specified time; and
sending, by the server device to the first computing device, an address associated with the third computing device and instructions to connect to the third computing device at the fourth specified time based at least in part on the address.

3. The method of claim 1, further comprising:
storing, by the server device, the address associated with the second computing device in a database.

4. The method of claim 1, further comprising:
storing, in a database by the server device, current state of connections of the first computing device and the second computing device.

5. The method of claim 1, further comprising:
filtering a plurality of computing devices based on a location of the plurality of computing devices.

6. The method of claim 1, wherein the address associated with the second computing device is a Bluetooth address associated with a Bluetooth device in the second computing device.

7. The method of claim 1, wherein:
sending instructions to re-query at a first specified time includes sending, by the server device to the first computing device, instructions to re-query after a specified delay; and
receiving a third query from the first computing device at the first specified time includes receiving, by the server device, the third query from the first computing device after the specified delay.

8. The method of claim 7, wherein the specified delay is at least one minute.

9. A computer-readable storage device comprising instructions that, when executed on at least one programmable processor, causes the at least one programmable processor to perform operations comprising:
receiving, by a server device, a first query from a first computing device;
responsive to receiving the first query, sending, by the server device to the first computing device, instructions to re-query at a first specified time;
receiving, by the server device, a second query from a second computing device;
responsive to receiving the second query, sending, by the server device to the second computing device, instructions to accept a connection at a second specified time that occurs after the first specified time;
receiving, by the server device, a third query from the first computing device at the first specified time; and
responsive to receiving the third query, sending, by the server device to the first computing device, an address associated with the second computing device and instructions to connect to the second computing device at the second specified time based at least in part on the address.

10. A server device comprising:
one or more processors;
a network interface configured to communicate with a first computing device and a second computing device;
a device connection module operable on the one or more processors and configured to:
receive, via the network interface, a first query from the first computing device,
responsive to receiving the first query, send to the first computing device, via the network interface, instructions to re-query at a first specified time,
receive, via the network interface, a second query from the second computing device,
responsive to receiving the second query, send to the second computing device, via the network interface, instructions to accept a connection at a second specified time that occurs after the first specified time,
receive, via the network interface, a third query from the first computing device at the first specified time, and
responsive to receiving the third query, send to the first computing device, via the network interface, an address associated with the second computing device and instructions to connect to the second computing device at the second specified time based at least in part on the address.

11. The computer-readable storage device of claim 9, the operations further comprising:
receiving, by a server device, a fourth query from a first computing device;
sending, by the server device to the first computing device, instructions to re-query at a third specified time;
receiving, by the server device, a fifth query from a third computing device;
sending, by the server device to the third computing device, instructions to accept a connection at a fourth specified time that occurs after the third specified time;
receiving, by the server device, a sixth query from the first computing device at the third specified time; and
sending, by the server device to the first computing device, an address associated with the third computing device and instructions to connect to the third computing device at the fourth specified time based at least in part on the address.

12. The computer-readable storage device of claim 9, the operations further comprising:
storing, in a database by the server device, current state of connections of the first computing device and the second computing device.

13. The computer-readable storage device of claim 9, the operations further comprising:

filtering a plurality of computing devices based on a location of the plurality of computing devices.

14. The computer-readable storage device of claim 9, wherein the address associated with the second computing device is a Bluetooth address associated with a Bluetooth device in the second computing device.

15. The computer-readable storage device of claim 9, wherein:

sending instructions to re-query at a first specified time includes sending, by the server device to the first computing device, instructions to re-query after a specified delay; and receiving a third query from the first computing device at the first specified time includes receiving, by the server device, the third query from the first computing device after the specified delay.

16. The server device of claim 10, wherein the device connection module is further configured to:

receive, by a server device, a fourth query from a first computing device;

send, by the server device to the first computing device, instructions to re-query at a third specified time;

receive, by the server device, a fifth query from a third computing device;

sending, by the server device to the third computing device, instructions to accept a connection at a fourth specified time that occurs after the third specified time;

receive, by the server device, a sixth query from the first computing device at the third specified time; and receive, by the server device to the first computing device, an address associated with the third computing device and instructions to connect to the third computing device at the fourth specified time based at least in part on the address.

17. The server device of claim 10, wherein the device connection module is further configured to:

store, in a database by the server device, current state of connections of the first computing device and the second computing device.

18. The server device of claim 10, wherein the device connection module is further configured to:

filter a plurality of computing devices based on a location of the plurality of computing devices.

19. The server device of claim 10, wherein the address associated with the second computing device is a Bluetooth address associated with a Bluetooth device in the second computing device.

20. The server device of claim 10, wherein:

sending instructions to re-query at a first specified time includes sending, by the server device to the first computing device, instructions to re-query after a specified delay; and receiving a third query from the first computing device at the first specified time includes receiving, by the server device, the third query from the first computing device after the specified delay.

* * * * *